(No Model.)
G. CRANE.
HORSE BLANKET.
No. 274,177. Patented Mar. 20, 1883.
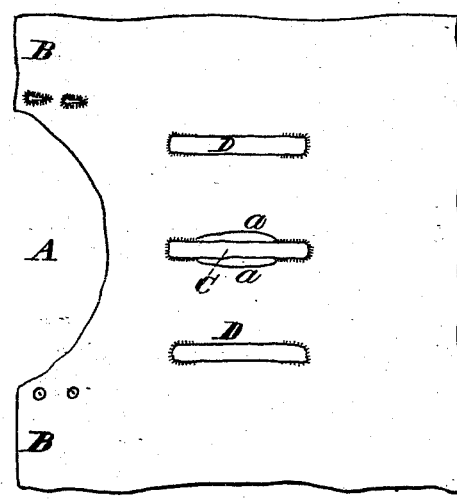
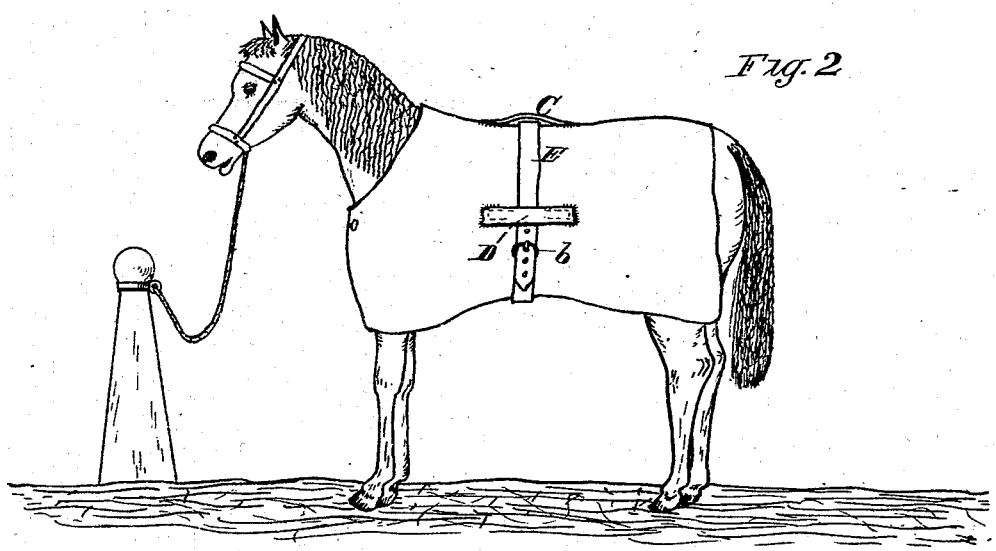
Witnesses:
Rob't W. Matthews
Thomas E. Crossman
Inventor:
Gerard Crane
per James A. Whitney, atty

UNITED STATES PATENT OFFICE.

GERARD CRANE, OF NEW YORK, N. Y., ASSIGNOR TO BRADFORD WILLARD, OF SAME PLACE.

HORSE-BLANKET.

SPECIFICATION forming part of Letters Patent No. 274,177, dated March 20, 1883.

Application filed March 11, 1882. (No model.)

*To all whom it may concern:*

Be it known that I, GERARD CRANE, of the city, county, and State of New York, have invented an Improvement in Horse-Blankets, of which the following is a specification.

This invention has a double object—namely, that of providing a horse-blanket which, when in use, shall not be liable to be torn at neck from the working back of the blanket when the horse is lying down, and the resultant excessive strain which occurs when the animal rises, and which tends to draw the blanket forward, causing a friction of the same against the direction of the hair of the animal; also to provide for the ventilation of the upper part of the blanket adjacent to the portions covered by the girth or surcingle.

My said invention comprises a horse-blanket of novel construction, which effectually secures the ends desired.

Figure 1 is a view of the horse-blanket as spread out to show its form and construction; and Fig. 2 is a side view, showing the blanket as placed upon the horse.

The blanket may be made of any suitable material, with a deep scallop or recess, A, at the front, in order that the flaps B may, when the blanket is put in position upon the animal, be brought around the neck of the latter and buttoned or otherwise fastened in front of the breast.

At or near the center of the blanket—that is to say, that portion which, when the blanket is placed upon the animal, will be upon the back or spine of the latter—is a longitudinal opening, *a*. C is a strap which extends longitudinally over this opening *a*, and with its ends fastened by sewing or otherwise to the blanket at the ends of said opening, as indicated more fully in Fig. 1. Midway between the strap C and each opposite lateral edge of the blanket is a strap, D, the ends of which are sewed or otherwise secured to the blanket.

When the blanket is placed upon the horse with the flaps B brought around the neck and fastened in front of the breast, as aforesaid, the girth or surcingle E is passed around the animal and underneath the strap C and straps D, and is then buckled as indicated at *b*. The straps C and D, being passed over the girth or surcingle E, form loops which prevent the blanket from working rearwardly upon the back of the horse, and consequently prevent the forward portion of the blanket—as, for example, the flaps B, buttoned or fastened in front of the breast, as aforesaid—from slipping back so as to draw it around the neck or upon the shoulders of the animal, so that when the animal lies down the blanket, instead of crowding back to draw tightly around the front of the animal, is held loose at such part, and when the animal rises sufficient room is afforded within the blanket to permit this without strain, whereas if such strain were suffered to exist, as in the ordinary horse-blanket, the stress produced by the movement of the animal in rising would tear and disrupt the same, as very frequently occurs with the ordinary blanket. Furthermore, the opening *a* being provided at the center of the blanket, and when the blanket is applied to the animal coming above the center of the back of the latter, and the strap C being more or less raised by the surcingle passing underneath the same, an outlet is afforded for the escape of vapors from the skin of the animal, and access is allowed to the air, the blanket, therefore, possessing not only the advantage of not tearing from the causes hereinbefore indicated, but being much better adapted to maintain the healthful condition of the animal as a ventilating-blanket.

What I claim as my invention is—

A blanket provided with the straps or loops D D, two or more, adapted to hold the surcingle in place, and the ventilating-opening *a*, all substantially as and for the purpose herein set forth.

GERARD CRANE.

Witnesses:
 ROBERT W. MATTHEWS,
 THOMAS E. CROSSMAN.